July 9, 1963

C. WESTRE 3,096,832

ICE HOLE CUTTER

Filed March 27, 1959

CLARENCE WESTRE
INVENTOR.

BY John L. Woodward
ATTORNEY

July 9, 1963
C. WESTRE
3,096,832
ICE HOLE CUTTER
Filed March 27, 1959
2 Sheets-Sheet 2
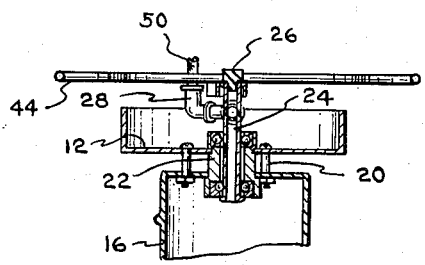
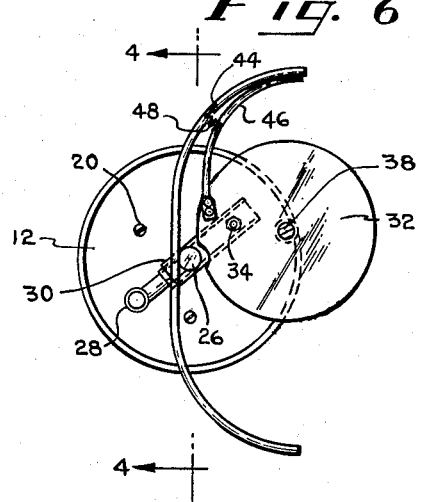
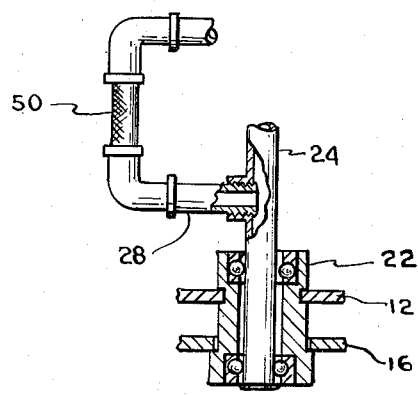
INVENTOR.
CLARENCE WESTRE
BY
John L. Woodward
ATTORNEY.

United States Patent Office 3,096,832
Patented July 9, 1963

3,096,832
ICE HOLE CUTTER
Clarence Westre, 5253 Queen N., Minneapolis, Minn.
Filed Mar. 27, 1959, Ser. No. 802,511
9 Claims. (Cl. 175—18)

This invention pertains to an ice hole cutter. In particular it pertains to a motor driven cutter for making cylindrical holes through frozen surface of the lake.

Heretofore, in apparatuses for cutting ice fishing holes using motor driven mechanism, the cutter element continued to operate after it had started to cut the hole in the ice. I employ means which easily and quickly interrupts the actuating of the cutter element while the motor is still operating.

This invention essentially comprises a circular cutter head provided with an upstanding circular flange on its periphery with a cylindrical cutter element depending from the under side of the cutter head. An upstanding conduit is rotatably mounted in the center of the cutter head and is in communication with the inside of the cylindrical cutter element. A motor carriage provided with a handle is removably mounted on a radial arm of the conduit. A gasoline motor is removably mounted on this carriage. The shaft of the motor extends through a hole of the motor carriage and a frictional member of cylindrical shape is mounted on the lower end of the motor shaft and in the same horizontal plane as the cutter head flange. The carriage handle is detachably connected by a spring means to a handle bar mounted on the radial arm holding the motor friction means from engagement with the cutter head flange. The carriage handle upon being actuated moves the motor shaft friction means into frictional engagement with the cutter head flange for rotating the cutter head and its cutter element. A flexible hose is utilized for connecting the exhaust of the gasoline motor with the cutter head conduit for supplying hot exhaust gases to the inside of the cutter element.

It is an object of this invention to provide in an ice hole cutter device means which easily and quickly either connects or disconnects the transmission of force from the motor to the cutter element.

It is another object of this invention to provide in an ice hole cutter device means for removably mounting the motor means on the ice cutter device.

It is yet another object of this invention to provide in an ice hole cutter device, motor means which frictionally actuates the cutter element.

It is still another object of this invention to provide in an ice hole cutting device, a gasoline motor for actuating the cutter element, and means for supplying the hot exhaust gases of the motor to the cutter element.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

FIGURE 4 is a sectional side elevation disclosing the cutter head and its bearing structure and the cutter element.

FIGURE 5 is a detailed view of the fitting connection between the motor exhaust and the hollow shaft for the cutter head.

FIGURE 6 is a detailed view disclosing the position of the spring for the motor carriage handle when the handle moves the carriage for engaging the frictional means on the motor shaft with the cutter head.

Figure 1:
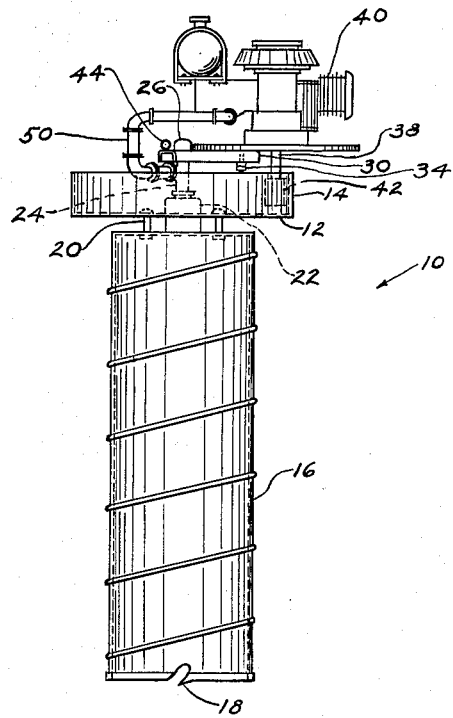
FIGURE 1 is an elevational view of the ice hole cutting device.

Referring to the drawing in detail, 10 refers to the ice hole cutting device in which 12 is a circular cutter head provided with a circular base portion having a circular upstanding flange 14 formed on its periphery for a purpose hereinafter set forth. A cylindrical cutter element 16 provided with a circular top 18. Blades are formed on the bottom of the cutter 16. Bolt and nut means 20 rigidly secure the base of the cutter head 12 in spaced relation to the top of the cutter 16, see FIGURE 1.

A hub 22 extends from a hole in the top of the cutter element 16 through a hole in the center of the base of the cutter head 12 and extends above the base of the cutter head 12. The hub 22 is loosely mounted in the top of the cutter element 16. The hub 22 is soldered to the base of the cutter head 12. The hub 22 is provided with a race above the base of the cutter head and below the top of the cutter element for housing ball bearings. A hollow shaft 24 provided with a plug 26 in its top is rotatably mounted in the hub 22. A fitting 28 is connected to the hollow shaft 24 for a purpose to be set forth hereinafter.

A radial or lateral arm 30 is rigidly secured on the shaft 24 and is provided with a hole adjacent its outer end. A circular platform or motor carriage 32 is provided with a depending lug 34 which removably fits into the hole in the lateral arm 30. A central hole 36 is provided in the carriage 32 for the reception of a shaft 38 of a gasoline motor 40 which is mounted on the carriage 32. A cylindrical shaped means 42 of appropriate material such as asbestos, rubber, etc. is mounted on the lower end of the motor shaft 38 for frictionally engaging the cutter head flange 14, as will be set forth hereinafter.

A handle bar 44 is appropriately rigidly secured to the inner end of the lateral arm 30. A handle 46 for the carriage 32 extends to one side of the carriage 32 and is detachably connected by a tension spring 48 to the handle bar 44. One end of the tension spring 48 is secured to handle 46 by means of an aperture therein. The handle bar 44 is adapted to move the carriage plate 32. Spring 48 is arc-shaped when it is connected between handle 46 of the carriage 32 and the handle bar 44 of rotatable means 24.

A flexible hose or other appropriate means 50 detachably connects the exhaust of the gasoline motor 40 with the fitting 28 for supplying hot exhaust gases through the hollow shaft 24 to the inside of the cylindrical cutter element 16 for heating the cutter element 16 so that the heated cutter element 16 will more easily cut an ice fishing hole in frozen ice on a lake etc., and it also prevents water freezing on the cutter element.

In operation of the ice cutting device 10, the cutter head 12 and its attached cutter element 16 are transported to a desired location on a frozen lake. Then the carriage plate 32 is mounted on the lateral arm 30 by inserting pin 34 of the carriage 32 into the hole in arm 30. The spring 48 on carriage handle 46 is connected to the handle bar 44 by means of an end thereof being received in a hole of the handle bar 44. The shaft 38 of the gasoline motor 40 is received into the hole 36 of the platform 32 with the frictional element 42 coupled thereto and the motor 40 rests on the platform 32, see FIGURE 1.

Figure 2:
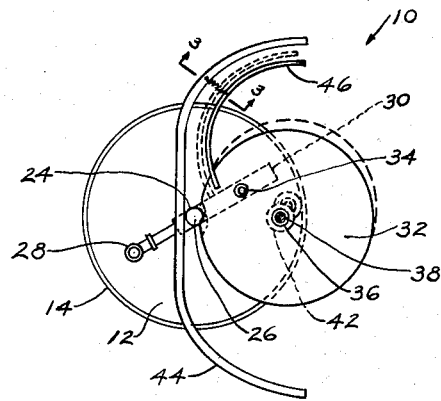
FIGURE 2 is a plan view of the ice hole cutting device, the motor being removed.
Figure 3:
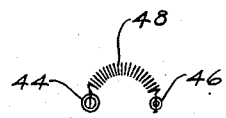
FIGURE 3 is a sectional view taken on line 3—3 of FIGURE 2, illustrating enlarged, the spring means for actuating the motor means from engagement with the cutter head.

When it is desired to actuate the ice cutting element 16, the handle 46 of the carriage 32 is moved by a thumb of the operator to engage the handle bar 44 which are held in a fixed position by the hands of the operator thus engaging the cylindrical friction means 42 on shaft 38 with the inside of the cutter head flange 14, see FIGURE 2, and power is transmitted from the motor 40 to the cutter head 12 for rotating the cutter element 16 which cuts a circular hole in the ice. When the handle 46 is moved toward handle bar 44, the handle 46 and carriage 32 are moved in a counter-clockwise direction and the tension spring 48 is moved in a clockwise direction.

If it is desired or required to cease cutting the ice hole, the operator's thumb releases the handle 46, and the tension spring 48 moves in a counter clockwise direction and the handle 46 is actuated in a clockwise direction away from the handle bar 44 which moves the carriage 32 in a clockwise direction, see FIGURE 2, thus disengaging the friction means from the cutter head flange 14.

The hot exhaust gases from the exhaust of the gasoline motor 40 are fed through the hose 50 and hollow shaft 24 to the inside of the cutter element 16, heating the cutter element 16, and makes it easier to cut ice holes in the frozen ice on lakes, rivers, etc.

The motor 40 and its carriage 32 can be easily removed from the cutter head 12 and be stored away in a heated automobile when the ice cutting device is not being used.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device for cutting holes in ice comprising a cutter head provided with a flange mounted for rotation about a substantially vertical axis, a cutter element rigidly secured to and depending from the cutter head, a hub member interconnected between the cutter head and cutter element, a hollow shaft rotatably mounted in the hub and connected to the inside of the cutter element, a support bar rigidly secured to the shaft and extending laterally therefrom, a carriage member pivotally mounted on the bar, a gasoline motor having a shaft provided with friction means thereon mounted on the carriage, the friction means being mounted in the same horizontal plane as the cutter head flange, a handle bar rigidly mounted on the bar, a handle rigidly secured to and extending from the carriage member, a biased spring means connected between the handle bar and the carriage handle for normally holding the carriage in a position whereby the friction means of the motor shaft is disengaged from the flange of the cutter head and conduit means connecting the exhaust of the gasoline motor with the hollow shaft for feeding, hot exhaust gases into the cutter element.

2. A device for cutting holes in ice comprising a cutter head provided with a circular upstanding flange means mounted for rotation about a substantially vertical axis, a cutting element rigidly secured to and depending from the cutter head, a hub interconnected between the cutter head and cutting element, a hollow shaft rotatably mounted in the hub, a support bar rigidly secured to and extending laterally from the shaft, a carriage pivotally mounted on the bar, a handle rigidly secured to the carriage, a gasoline motor provided with a shaft mounted on the carriage, the motor shaft extending through a hole in the carriage, a friction means fastened to the lower end of the motor shaft and being in the same horizontal plane with the flange of the cutter head, a handle bar means rigidly mounted on the bar, an arc-shaped biased spring detachably connected between the carriage handle and the handle bar for normally holding the carriage in a position whereby the friction means of the motor shaft is disengaged from the cutter head flange, the carriage being pivoted by its handle in a counter-clockwise direction for engaging the friction means of the motor shaft with the cutter head flange thereby rotating the cutter head and its cutter element for cutting a hole in the ice, and a conduit means connected between the exhaust of the gasoline motor and the hollow shaft for feeding hot exhaust gases to the inside of the cutting element.

3. A device as set forth in claim 2 wherein the cutter element is of cylindrical shape.

4. A device as set forth in claim 2 wherein the carriage means for carrying the gasoline motor is provided with a depending pin receivable in a hole in the lateral bar adjacent its outer end for removably mounting the carriage on the bar.

5. A device for cutting holes in ice comprising a cutter head mounted for rotation about a substantially vertical axis provided with a flange means, a cutter element rigidly mounted to and depending from the cutter head, a hub member interconnected between the cutter head and cutter element, a shaft rotatably mounted in the hub, an arm rigidly secured to the shaft and extending laterally therefrom, a handle bar rigidly secured to the arm, a carriage pivotally mounted on the lateral arm, and a means mounted on the carriage provided with a friction means mounted in the same horizontal plane as the cutter head flange for actuating the cutter head, a handle rigidly secured to the carriage being movable in a counter-clockwise direction toward the handle bar thus moving the carriage in a counter-clockwise direction for engaging the friction means of the actuating means with the flange of the cutter head for actuating the cutter head and the interconnected cutter element, the carriage handle being manually movable away from the handle bar thus moving the carriage in a clockwise direction thereby disengaging the friction means of the actuating means from the flange of the cutter head.

6. A device as set forth in claim 5 wherein the carriage for mounting the actuating means is provided with a depending pin receivable in a hole in the lateral arm adjacent its outer end for removably mounting the carriage on the lateral arm.

7. A device as set forth in claim 5 wherein the actuating means is a motor means.

8. A device as set forth in claim 5 wherein the actuating means is a gasoline motor means.

9. A device for cutting holes in ice comprising a cutter head provided with a flange means mounted for rotation about a substantially vertical axis, a cutter element rigidly secured to and depending from the cutter head, a hub interconnected between the cutter head and the cutter element, a shaft rotatably mounted in the hub, a bar rigidly secured to the shaft and extending laterally therefrom, a carriage member pivotally mounted on the bar, a gasoline motor mounted on said carriage and having a shaft provided with friction means thereon, the friction means being mounted in the same horizontal plane as the flange of the cutter head, a handle bar rigidly mounted on the bar, a handle rigidly secured to and extending from the carriage, the carriage handle being spaced behind and in the same horizontal plane as the handle bar, a biased spring means connected between the handle bar and the carriage handle for normally holding the carriage in a position whereby the friction means on the motor shaft is disengaged from the flange of the cutter head, the carriage handle pivoting the carriage in a counter-clockwise direction for moving the friction means on the motor shaft into operational engagement with the flange of the cutter head.

References Cited in the file of this patent

UNITED STATES PATENTS

| 2,526,131 | Harnish et al. | Oct. 17, 1950 |
| 2,739,551 | Rabezzana | Mar. 27, 1956 |
| 2,846,192 | Ostling | Aug. 5, 1958 |